United States Patent

Fujii et al.

Patent Number: 6,134,925
Date of Patent: Oct. 24, 2000

[54] WASHING MACHINE

[75] Inventors: Hiroyuki Fujii; Fumio Ota, both of Hyogo; Yuko Omura, Kyoto; Shunji Imai, Osaka, all of Japan

[73] Assignee: Matsushita Electric Industrial Co., Ltd., Osaka, Japan

[21] Appl. No.: 09/219,507

[22] Filed: Dec. 23, 1998

[30] Foreign Application Priority Data

Dec. 26, 1997 [JP] Japan ...................................... 9-359612

[51] Int. Cl.⁷ .................................................. D06F 33/02
[52] U.S. Cl. ...................... 68/12.04; 68/12.05; 68/12.12; 68/12.14; 68/23.5; 68/148
[58] Field of Search ............... 68/12.04, 12.05, 68/12.12, 12.14, 23.5, 148

[56] References Cited

FOREIGN PATENT DOCUMENTS 59-10839  3/1984  Japan .

*Primary Examiner*—Philip R. Coe
*Attorney, Agent, or Firm*—Wenderoth, Lind & Ponack, L.L.P.

[57] ABSTRACT

A washing machine having a water supply valve 10 to supply water into a washing spin tank 2. The washing spin tank 2 is rotatably provided inside outer tank 1. The washing machine also has a motor 5, etc., and a controller to control the washing machine as a whole. The controller is provided with a first process of rotating the washing spin tank 2 while supplying water and a second process of sprinkling water into the washing spin tank 2 after raising the washing water in between the outer tank 1 and the washing spin tank 2 by centrifugal force due to the rotation of the washing spin tank 2. The result being reduced damage and tangling of the wash while efficiently utilizing washing time, securing cleansing force, and reducing non-uniformity of washing.

17 Claims, 11 Drawing Sheets

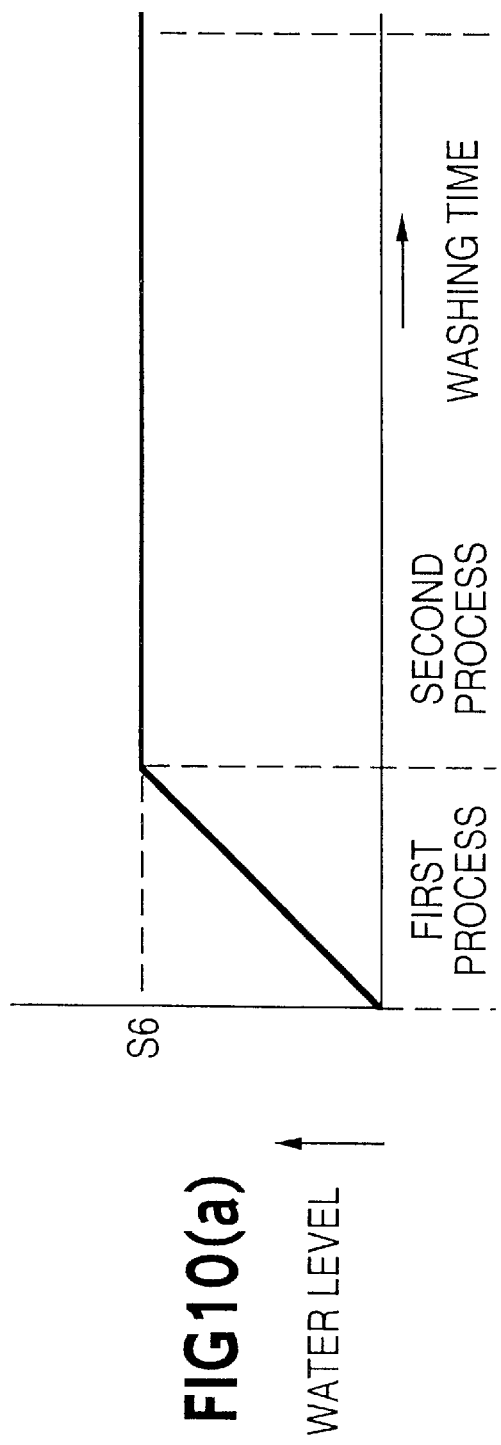
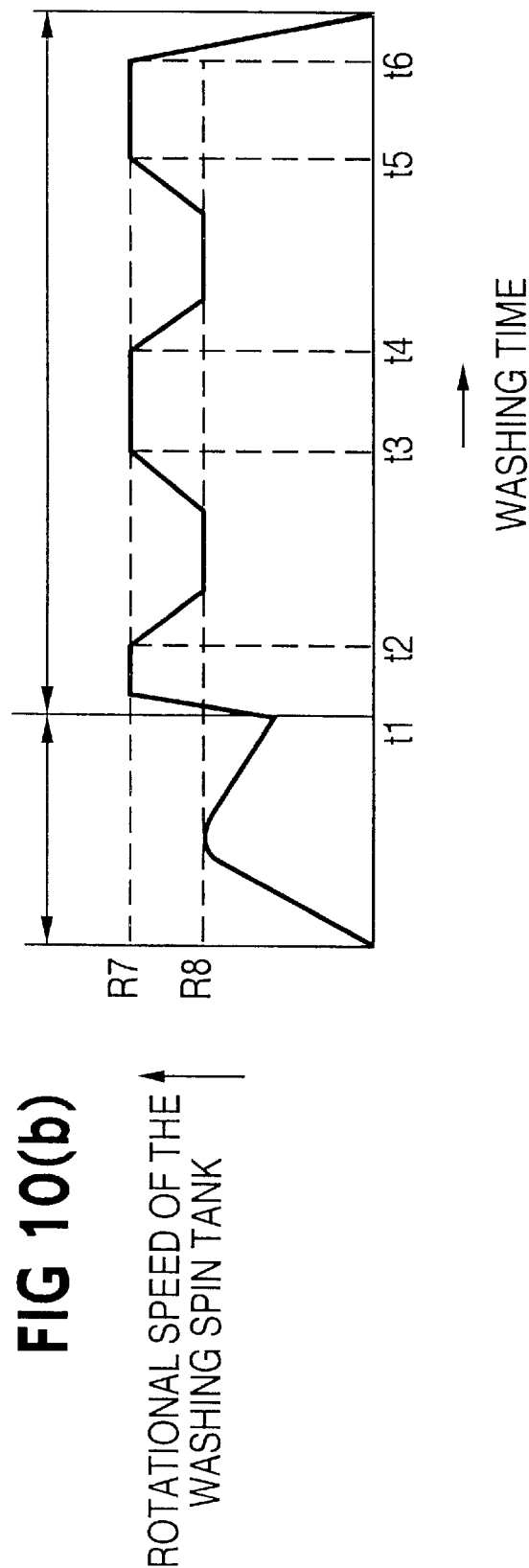
FIG 10(a)
FIG 10(b)

WASHING MACHINE

FIELD OF THE INVENTION

The present invention relates to a washing machine in which damage and tangling of clothes due to mechanical forces during washing are minimized and dirt is efficiently removed by an effective action of washing water.

BACKGROUND OF THE INVENTION

Referring to FIG. 11, a structure of a pulsator type washing machine which is one of the representative washing systems is explained in the following.

As illustrated in FIG. 11, an outer tank 30 contains a washing spin tank 32 on the bottom of which a pulsator 31 is rotatably disposed, and is suspended with plurality of suspension rods 33 from an outer frame 34 of a washing machine. A motor 35 drives the pulsator 31 or the washing spin tank 32 via a V-belt 36 and a speed-reduction mechanism and clutch 37. A drain valve 38 is for draining washing water from inside the washing spin tank 32 which is provided with a multiplicity of holes on its outer wall, while a water supply valve 39 is for supplying water into the washing spin tank 32.

A fluidic balancer 40 is provided on an upper part of the washing spin tank 32 to reduce vibration during spin drying, and a lid 41 is disposed above it. A control apparatus 42 successively controls each of the washing, rinsing, and spin-drying processes by controlling the motor 35, the drain valve 38, and the water supply valve 39, etc.

Action of the above structure is next described. Upon starting washing after putting a wash and a predetermined quantity of detergent into the washing spin tank 32, the water supply valve 39 is controlled by the control apparatus 42 and a predetermined quantity of water is supplied into the washing spin tank 32; subsequently, the control apparatus 42 controls the motor 35 to rotate the pulsator 31. The wash and water inside the washing spin tank 32 are stirred by the rotation of the pulsator 31, and this stirring gradually causes the detergent to dissolve, producing washing water which acts on the dirt of the wash.

However, in a washing machine of this structure, it is general practice to stir the wash and water by rotating the pulsator 31 at a high speed in order to dissolve the loaded detergent. In this case, in order to keep the wash insulated from excessive mechanical force, stirring by the pulsator 31 used to be started after a predetermined quantity of water has been supplied to the washing spin tank 32.

In other words, the time spent during supplying water does not have any benefit from the standpoint of removal of dirt because stirring by the pulsator 31 is not started until a predetermined quantity of water has been supplied. Also, since the supplied water penetrates into the wash as it is, a certain period of time is required until the detergent, which had started to dissolve with the start of the stirring, penetrates into the entire wash and comes to a uniform concentration required for the removal of dirt, again spending idle time from the standpoint of removal of dirt.

From the standpoint of damage of the wash, too, it is inefficient to start the stirring by the pulsator 31 from a state in which the detergent is not fully acting on the wash. That is, when the wash is stirred in a state in which the detergent has not penetrated into the wash, a large frictional force is applied to the surface of the wash, presenting problems of damaging the wash, such damage including napping of the surface.

SUMMARY OF THE INVENTION

The present invention addresses the above described problems and aims at reducing the damage and tangling of the wash, as well as efficiently using washing time, securing washing ability and reducing non-uniformity of washing by dissolving detergent with the start of the supply of water without stirring a pulsator and by sprinkling dissolved washing water uniformly over the wash without stirring a pulsator.

In order to achieve the above-described aim, the washing machine in accordance with the present invention is structured in such a way that a washing spin tank is rotatably provided inside an outer tank, a pulsator is rotatably provided on the inside bottom of the washing spin tank, and the washing spin tank is driven by drive means. Control means controls the process by controlling the actions of water supply means to supply water into the washing spin tank and the drive means, wherein the control means provides a first process of rotating the washing spin tank while supplying water and a second process of raising washing water between the outer tank and the washing spin tank by the rotation of the washing spin tank, and sprinkling the washing water from above into the washing spin tank.

With this structure, it becomes possible to make the washing water act on the dirt on the wash from the start of the water supply process, and to remove dirt without exerting a mechanical force on the wash by making the washing water act on the dirt by uniformly sprinkling it over the wash, thus preventing damage or tangling of the wash.

The present invention comprises a washing spin tank rotatably provided inside an outer tank, a pulsator rotatably provided on the side bottom of the washing spin tank, water supply means to supply water into the washing spin tank, drive means to drive the washing spin tank, and control means to control the actions of the water supply means, the drive means, etc., and the process, wherein the control means provides a first process of rotating the washing spin tank while supplying water and a second process of raising washing water in between the outer tank and the washing spin tank by rotation of the washing spin tank and sprinkling the washing water from above into the washing spin tank. Thus, it is possible in the first process to make the washing water act on the dirt of the wash from the start of the water supply process, and in the second process to remove dirt without exerting a mechanical force on the wash by making the washing water act on the dirt by uniformly sprinkling it over the wash, thereby preventing damage and tangling of the wash.

The invention as described above may also have quantity-of-clothes detection means to detect the quantity of the wash inside the washing spin tank in which the control means is made so as to start the first process after detecting the quantity of clothes, thereby allowing the washing water to directly penetrate into the wash with the start of water supply after detection of clothes.

The invention as described above may also have the control means make the rotational speed of the washing spin tank variable in at least one of the first and the second processes depending on the level of water inside the washing spin tank, thereby allowing optimum dissolution of detergent and optimum sprinkling of the washing water.

The invention as described above may also have the control means made as to intermittently sprinkle from above in the second process so as to control lathering of the washing water.

BRIEF DESCRIPTION OF THE DRAWINGS

FIG. 10(a) is a time chart illustrating water level of a washing machine in the fourth exemplary embodiment of the present invention;

FIG. 10(b) is a time chart illustrating rotational speed of the washing spin tank of the washing machine in the fourth exemplary embodiment of the present invention.

DESCRIPTION OF THE PREFERRED EMBODIMENT

Referring to drawings, exemplary embodiments of the present invention are explained in the following.

First Exemplary Embodiment

Figure 1:
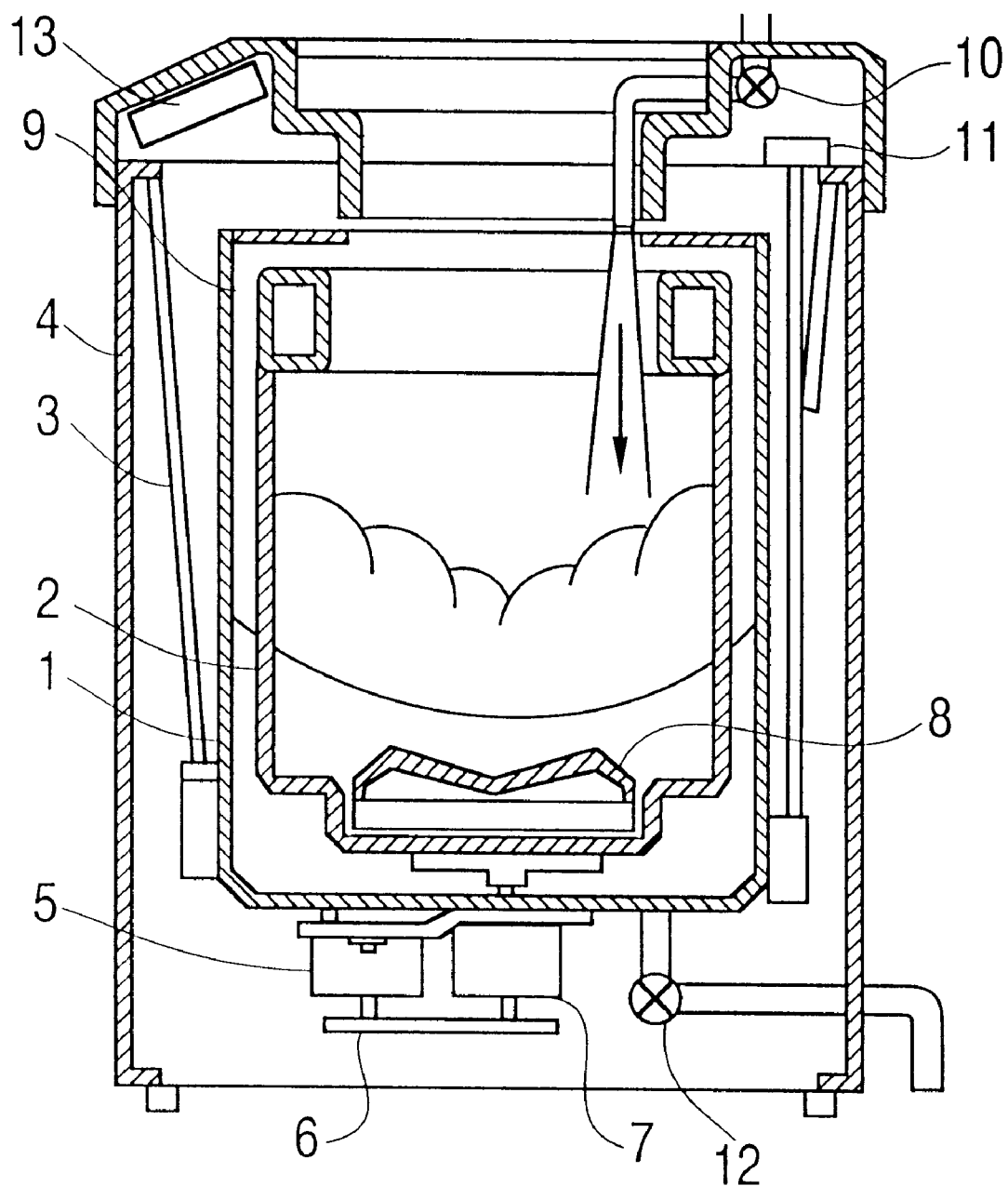
FIG. 1 is a vertical cross sectional view of a washing machine in the first exemplary embodiment of the present invention.

As shown in FIG. 1, an outer tank 1 contains a rotatably provided washing spin tank 2. The outer tank 1 is suspended from a washing machine outer frame 4 with a plurality of suspension rods 3. A motor (drive means) 5 rotates and drives the washing spin tank 2 via a V-belt 6 and a speed-reduction mechanism 7, and also a pulsator 8 which is rotatably provided on the inside bottom of the washing spin tank 2. A covering member 9 is formed in such a way that the upper part of the outer tank 1 is folded toward the center, thus forming between the covering member and the upper peripheral wall of the washing spin tank 2, an outlet for sprinkling water which guides washing water which has been raised along the inner wall of the outer tank 1 by centrifugal force into the washing spin tank 2. A water supply valve (water supply means) 10 supplies water into the washing spin tank 2, a water level detection means 11 detects the level of the water inside the outer tank 1, and a drain valve 12 drains the washing water from inside the outer tank 1.

Figure 2:
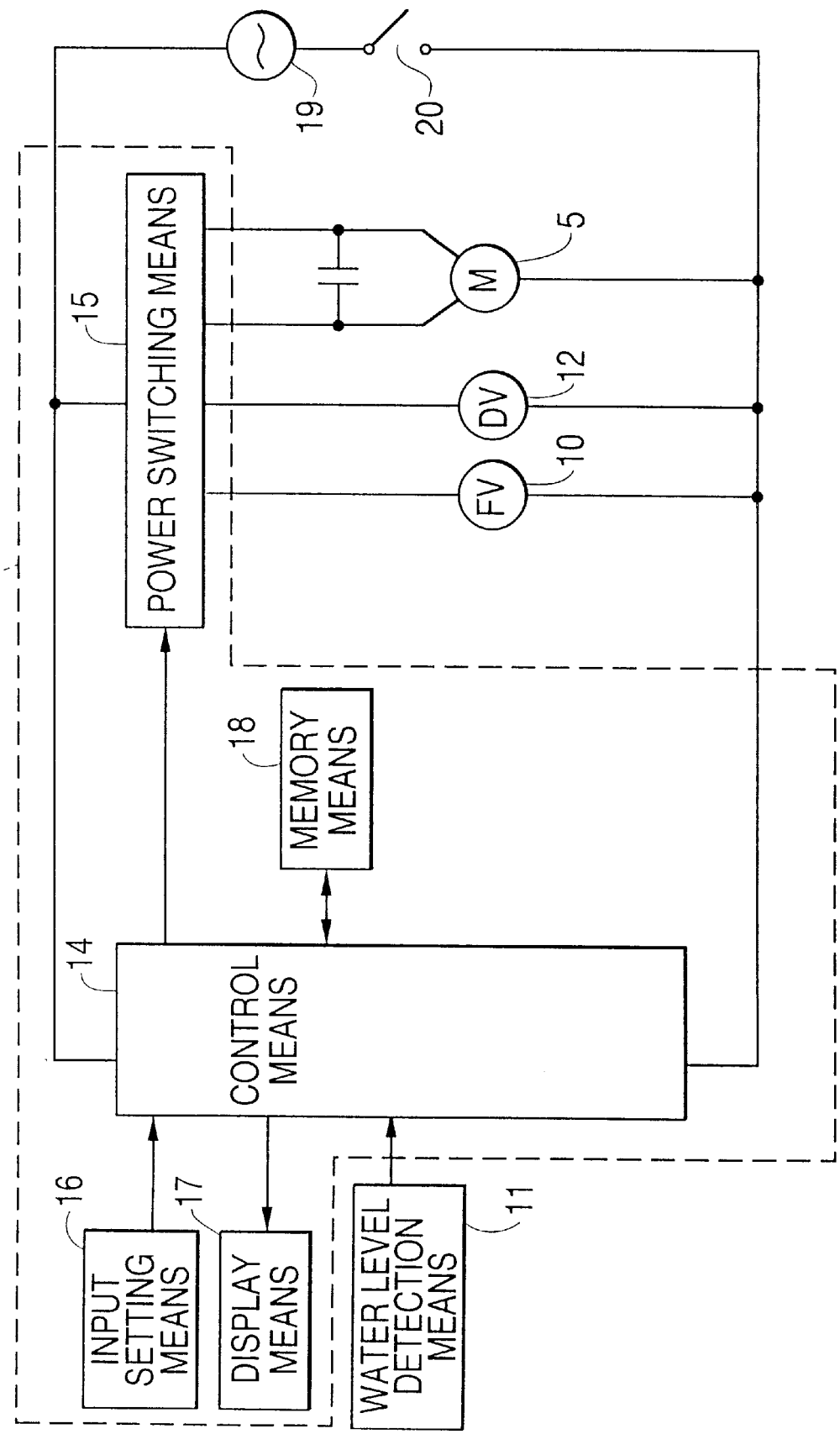
FIG. 2 is a block diagram of the washing machine.

A control apparatus 13 has a structure as shown in FIG. 2, of which control means 14 comprises a microcomputer that controls the actions of the motor 5, the water supply valve 10, and the drain valve 12 via power switching means 15, and successively controls a series of processes such as washing, rinsing, and spin drying. Input setting means 16 is for setting a mode of operation and the like, and the control means 14 accepts an input of information from the input setting means 16 and controls the information displayed on display means 17 to let the user know the settings. Memory means 18 stores data necessary for control by the control means 14. The numerals 19 and 20 represent a commercial power source and a power switch, respectively.

The control means 14 provides a first process of rotating the washing spin tank 2 while supplying water in a washing process and a second process of sprinkling washing water into the washing spin tank 2 from between the outer tank 1 and the washing spin tank 2 by the rotation of the washing spin tank 2.

Figure 3:
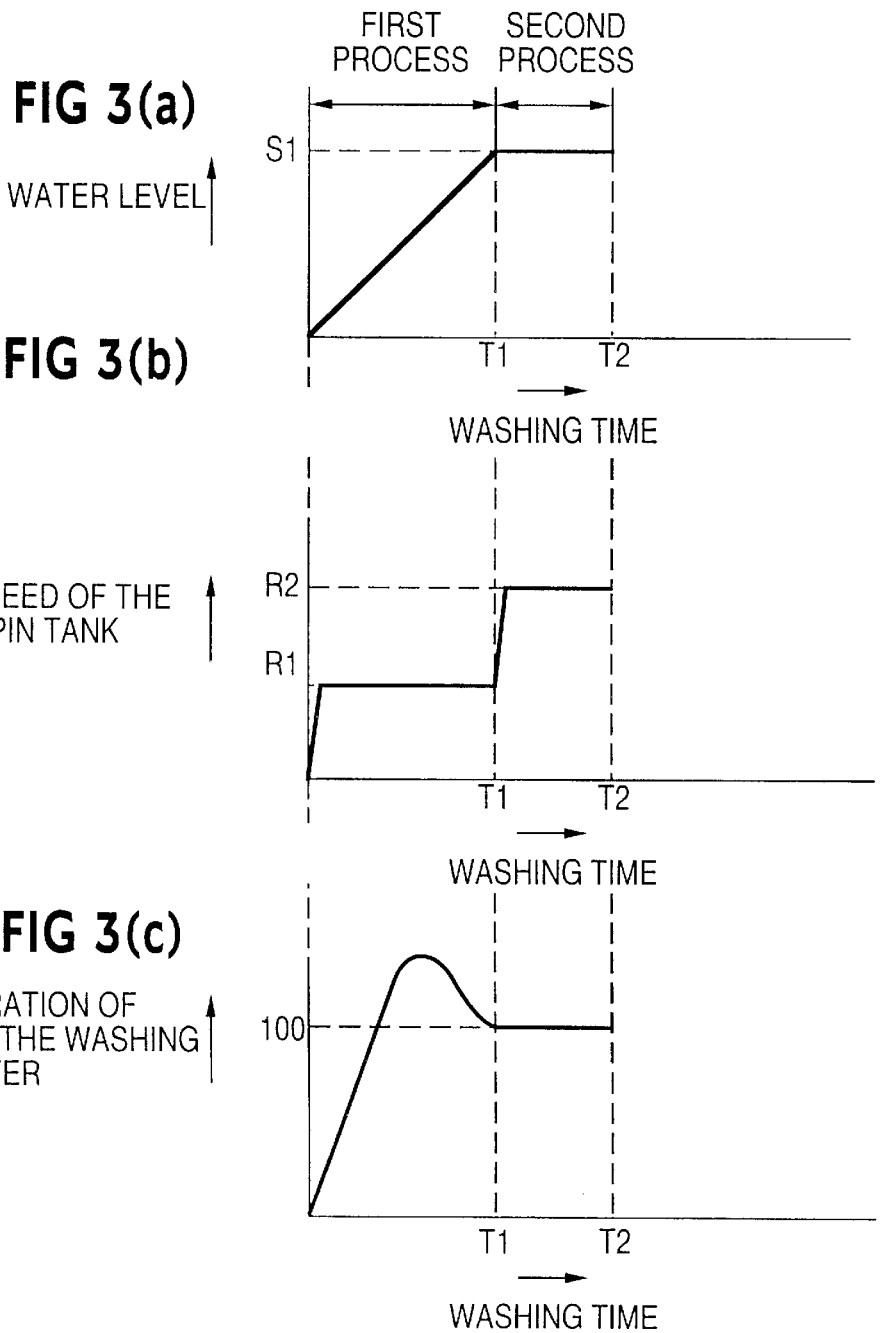
FIG. 3(a) is a time chart to illustrate change of water level of the washing machine.
FIG. 3(b) is a time chart to illustrate change of rotational speed of the washing spin tank of the washing machine.
FIG. 3(c) is a time chart illustrating change of concentration of detergent in the washing water of the washing machine.

Operation of the above structure is now described referring to FIGS. 3(a)–(c). After a wash and detergent have been introduced into the washing spin tank 2, the first process of rotating the washing spin tank 2 while supplying water into the washing spin tank 2 by operating the water supply valve 10 is carried out. The washing spin tank 2 is rotated at a rotational speed of R1 as shown in FIG. 3(b) until time T1 when the water level inside the washing spin tank 2 reaches a preset water level S1 shown in FIG. 3(a). When water is supplied while rotating the washing spin tank 2 in this fashion, the introduced detergent starts to dissolve due to a stirring force generated by the rotation of the washing spin tank 2, and the concentration of detergent in the washing water inside the washing spin tank 2 starts to increase with the start of rotation as shown in FIG. 3(c). After passing a high-concentration state in which the concentration momentarily exceeds 100%, an approximately 100% concentration is finally reached.

This action of supplying water to a preset level while rotating the washing spin tank 2 is the first process. During the period until T1 of the first process, high-concentration washing water gradually penetrates into the wash, acting on the dirt, and the washing water passes through the wash by a centrifugal force generated by the rotation of the washing spin tank 2, thus acting on the dirt of the wash. Also, since no frictional force is directly applied to the wash during this first process, there is no danger of damaging the wash.

Figure 4:
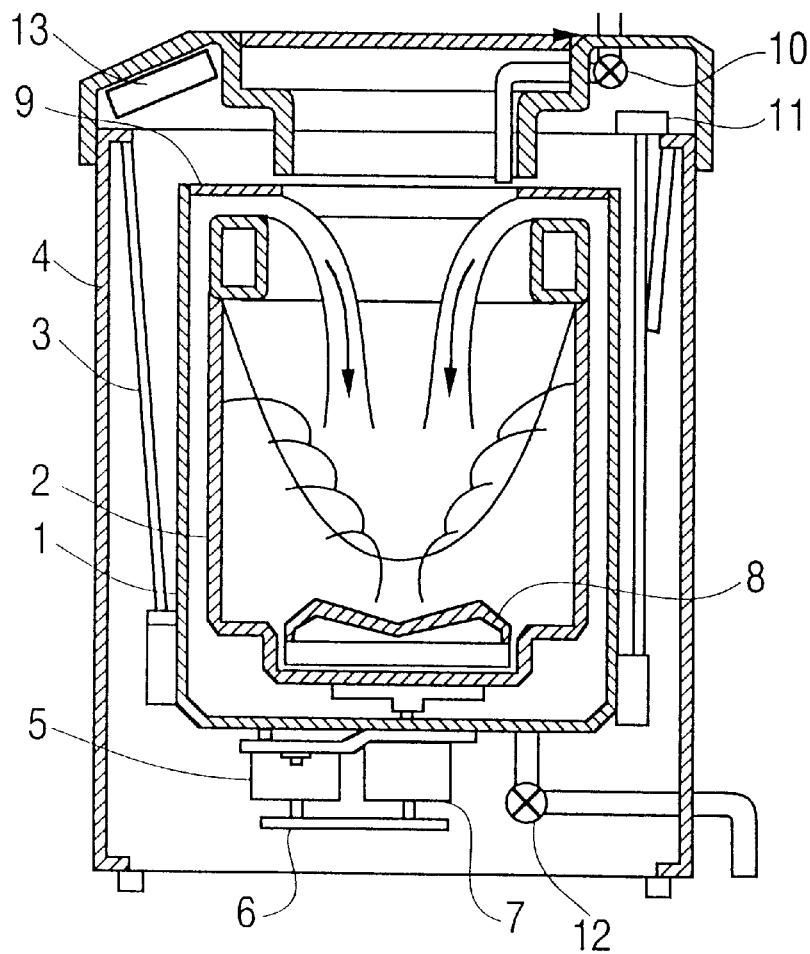
FIG. 4 is a vertical cross sectional view of the washing machine while in operation in the second process.

Next, the action of the second process is described. The supplying of water is stopped by closing the water supply valve 10 at time T1 at which time the level of water inside the washing spin tank 2 reaches S1, and the rotational speed of the washing spin tank 2 is increased. By increasing the rotational speed of the washing spin tank 2, the force of stirring the washing water is increased, and the central part of the water surface inside the washing spin tank 2 goes down as shown in FIG. 4 and the water between the washing spin tank 2 and the outer tank 1 rises, eventually exceeds the height of the upper end of the washing spin tank 2, and is guided by the covering member 9 and sprinkled from the outlet into the washing spin tank 2. The rotational speed R2 has been preset at a rotational speed at which the washing water can be sprinkled into the washing spin tank 2.

The second process of action is a process in which the washing water is sprinkled from above the washing spin tank 2 during the period between T1 and T2 and passes and circulates through the wash. In this process, the washing water is uniformly supplied to the wash, and the sprinkled washing water repeatedly passes and circulates through the wash by centrifugal force due to the rotation of the washing spin tank 2, and the dirt on the wash is removed by the repeated passage of the washing water through the wash. Also in this second process, since the wash is not directly stirred during sprinkling and passage of the washing water, there is no danger of damaging the wash.

Second Exemplary Embodiment

Figure 5:
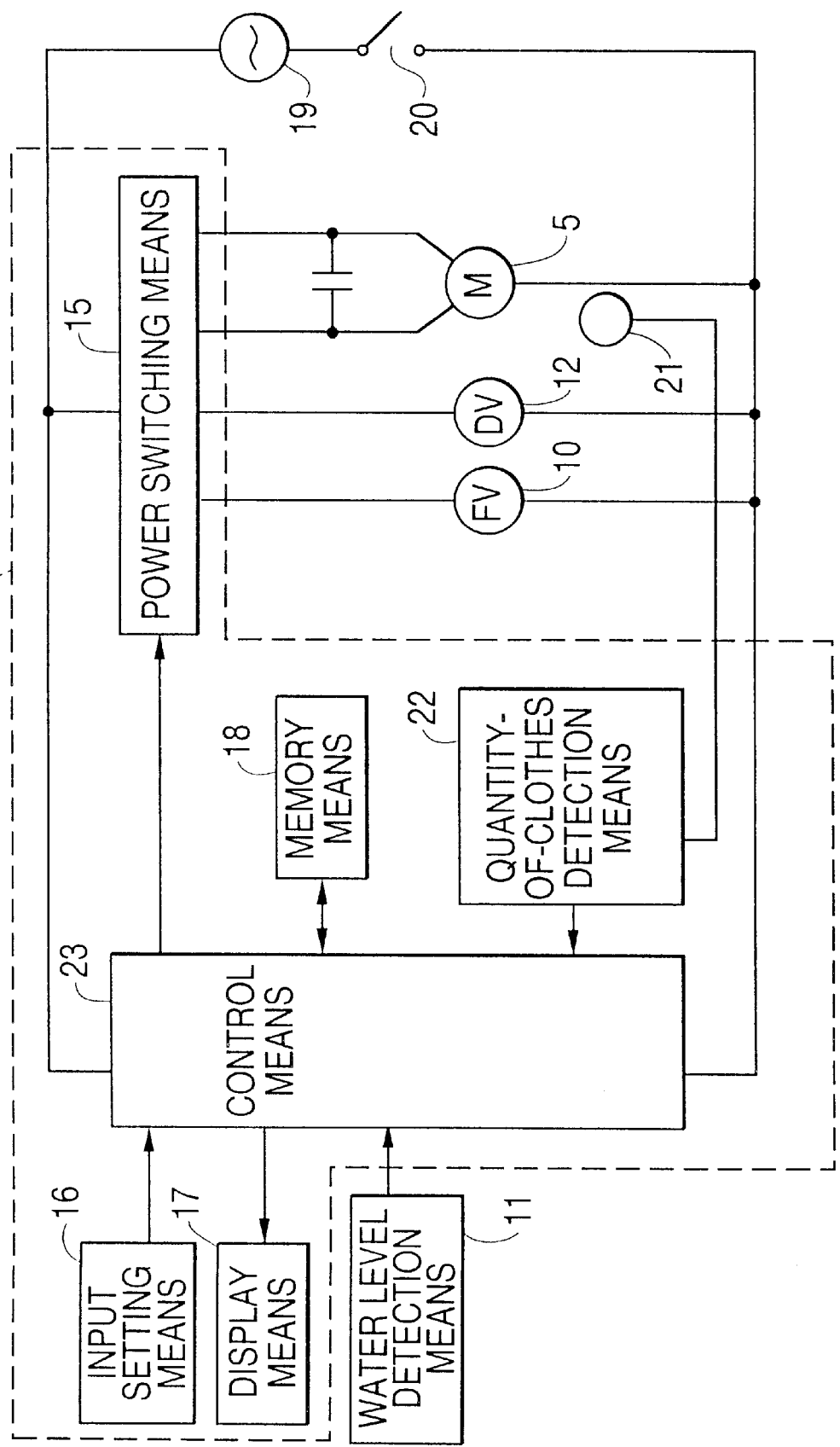
FIG. 5 is a block diagram of a washing machine in the second exemplary embodiment of the present invention.

As shown in FIG. 5, rotation detection means 21 comprises a Hall IC or the like and is fitted on the motor 5. Quantity-of-clothes detection means 22 for detection of the quantity of the wash inside the washing spin tank 2 is supplied with the output of the rotation detection means 21, and detects the quantity of the wash inside the washing spin tank 2 based on the degree of decrease of the rotational speed of the pulsator 8 when the motor 5 stops driving the pulsator 8 in a state in which the wash is inside the washing spin tank 2. Control means 23 determines the level of washing water to be set from among a plurality of levels based on a signal from the quantity-of-clothes detection means 22 and starts the first process upon detection of the quantity-of-clothes. Other structures are the same as the above-described first exemplary embodiment.

Operation of the above structure is now described. Upon start of operation after introducing a wash and detergent into the washing spin tank 2, the motor 5 is caused to operate by the control means 23 and the pulsator 8 is rotated, and the wash is stirred for a certain period of time. A signal generated in the rotation detection means 21 during this time is sent to the quantity-of-clothes detection means 22, which determines the quantity of the wash inside the washing spin tank 2 based on the signal.

After detecting the quantity of the wash with the quantity-of-clothes detection means 22, the control means 23 sets a level of washing water in accordance with the quantity of the wash, causes the water supply valve 10 to operate and starts supplying water, and the washing spin tank 2 is made to rotate at the same time, thus starting the first process.

Consequently, by rotating the washing spin tank 2 while supplying water to a level appropriate for the quantity of the wash, it is possible to directly penetrate washing water into the wash at the same time water supply is started.

Third Exemplaiy Embodiment

Figure 6:
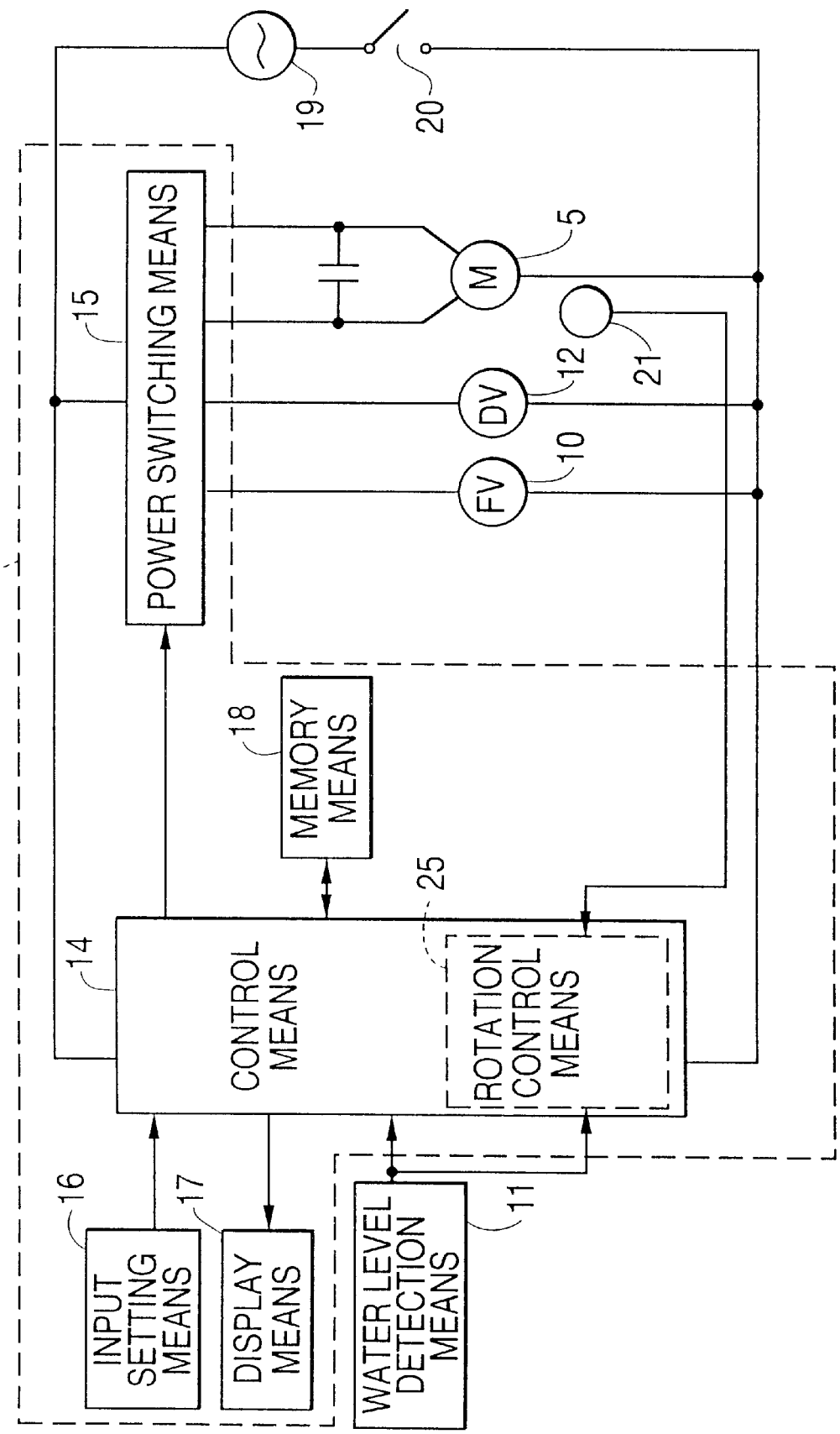
FIG. 6 is a block diagram of a washing machine in the third exemplary embodiment of the present invention.
Figure 7:
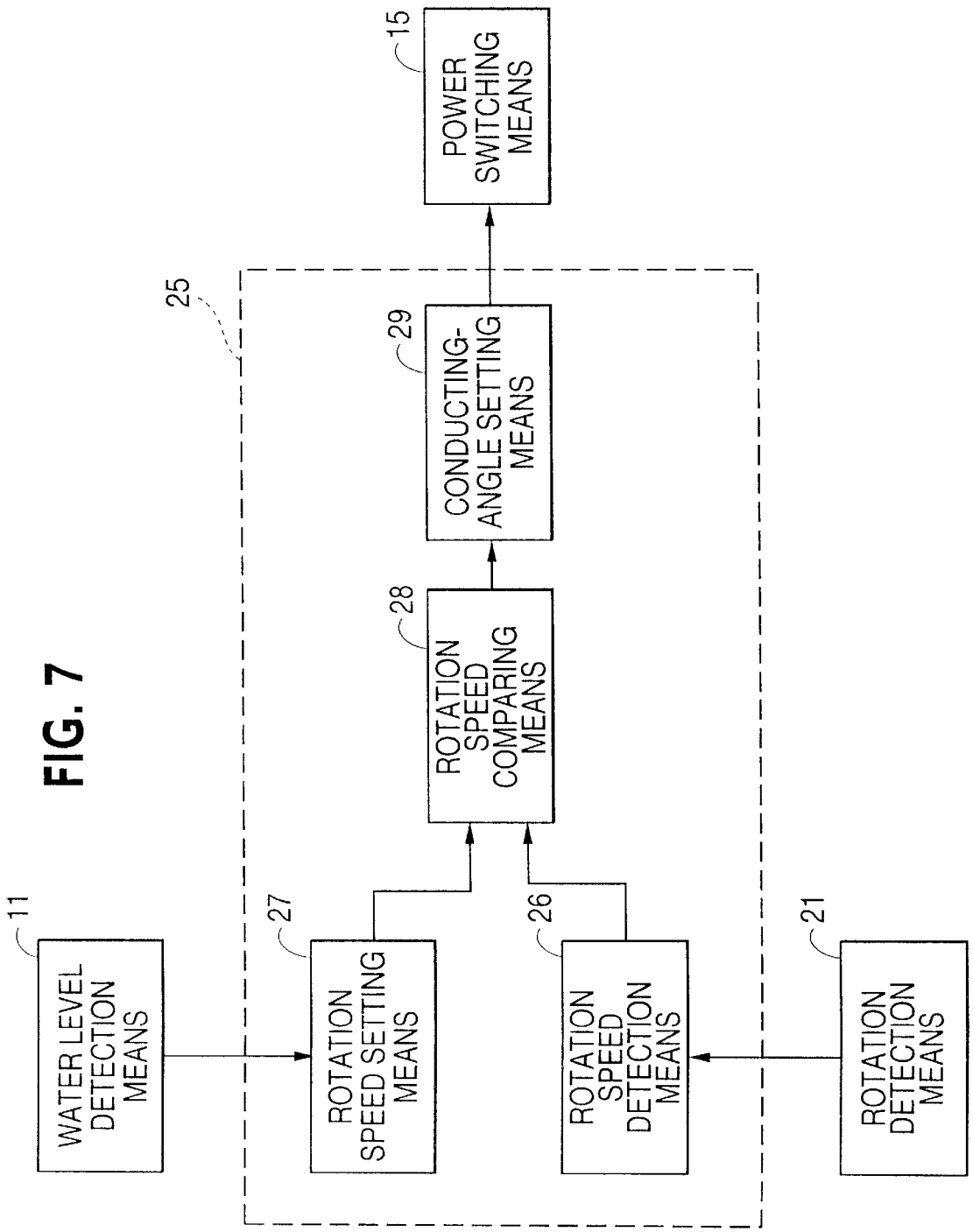
FIG. 7 is a block diagram of control means of the washing machine.

As shown in FIG. 6, control means 24 is provided with rotation control means 25 to control the rotational speed of the motor 5, and the rotation control means 25 comprises, as shown in FIG. 7, rotational speed detection means 26 to detect the rotational speed based on the output of the rotation detection means 21, rotational speed setting means 27 to set the rotational speed based on the output of water level detection means 11, rotational speed comparing means 28 to compare the output of the rotational speed detection means 26 with the output of the rotational speed setting means 27, and conducting-angle setting means 29 to set the conducting angle of power switching means 15 based on the output of the rotational speed comparing means 28.

The water level inside a washing spin tank 2 is detected by the water level detection means 11 and the information obtained is sent to the rotational speed setting means 27. Rotational speeds of the motor 5 appropriate for different water levels have been set in the rotational speed setting means 27 in such a way that the rotational speed of the washing spin tank 2 can be varied in at least one of the first and the second processes depending on the water level.

Figure 8A:
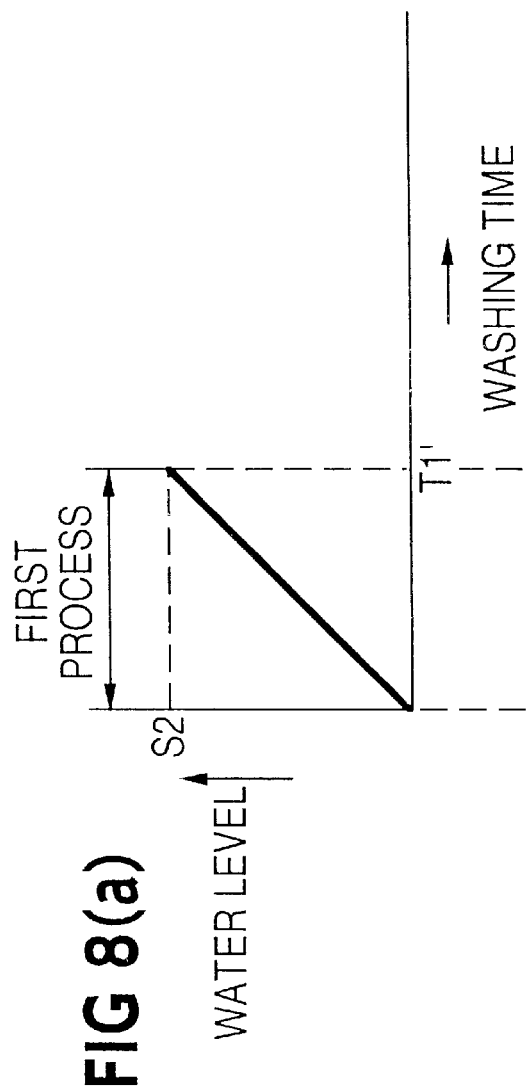
FIG. 8(a) is a time chart illustrating change of water level while the washing machine is in operation in the first process.
Figure 8B:
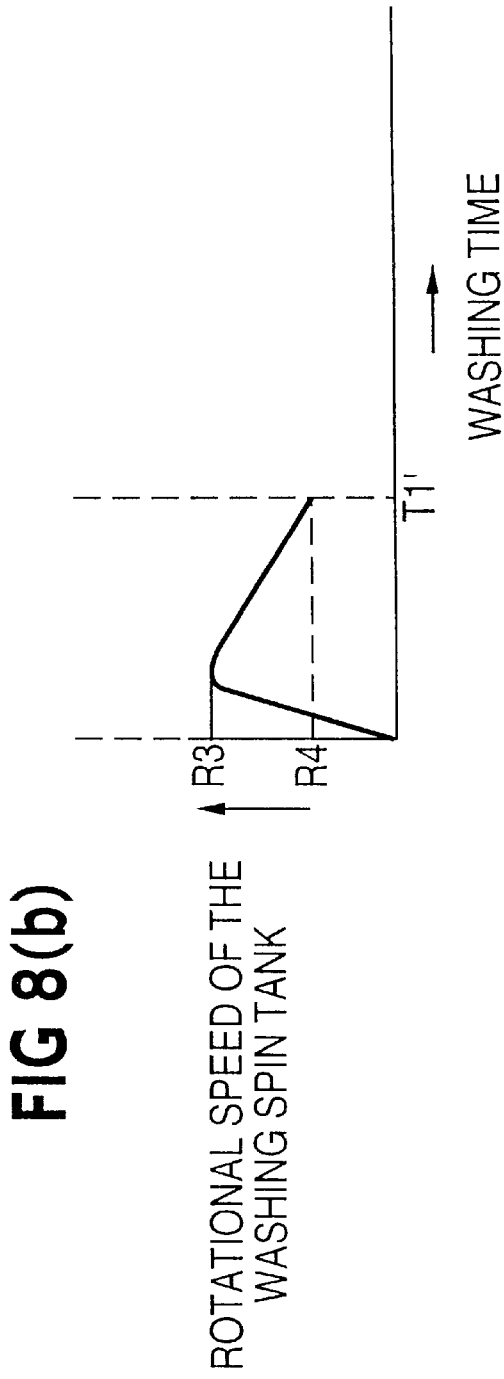
FIG. 8(b) is a time chart illustrating change of rotational speed of the washing spin tank while the washing machine is in operation in the first process.

Referring to FIG. 8, a description will be made on the operation of the above structure in the first process of rotating the washing spin tank 2 while supplying water.

When operation is started after a wash and detergent have been introduced into the washing spin tank 2, the water supply valve 10 is operated by the control means 24 and water is supplied into the washing spin tank 2. At the same time, the motor 5 starts to operate making the washing spin tank 2 rotate. As time passes, the water level inside the washing spin tank 2 rises toward S2. The water level inside the washing spin tank 2 is detected by the water level detection means 11, and the information obtained is transmitted to the rotational speed setting means 27.

In the rotational speed setting means 27, appropriate rotational speeds corresponding to different water levels have been preset. Information on an appropriate rotational speed is sent from the rotational speed setting means 27 to the rotational speed comparing means 28 upon receiving water level information from the water level detection means 11, comparison is made with the output of the rotational speed detection means 26 by the rotational speed comparing means 28, and the rotational speed of the motor 5 is controlled by setting the conducting angle of the power switching means 15 by the conducting-angle setting means 29.

FIGS. 8(a) and (b) illustrate a case in which the rotational speed of the washing spin tank 2 is varied in response to a change in the water level inside the washing spin tank 2 in the first process. When water is supplied while the washing spin tank 2 is rotated at a constant speed, the surface of water between the outer tank 1 and the washing spin tank 2 rises as the water level inside the washing spin tank 2 gradually rises, creating resistance to disturb rotation of the washing spin tank 2. When the washing spin tank 2 is made to continue rotating at a constant speed, problems may occur such as a remarkable increase in the power consumption of the motor 5 or breakdown when the temperature of the motor 5 increases beyond the allowable range.

In order to solve these problems, it is necessary to control the load on the motor 5 to maintain it below a certain level. The inventors have confirmed that it is effective to gradually reduce the rotational speed of the washing spin tank 2 from a predetermined value of R3 to R4, as shown in FIG. 8, by detecting a rise of the water level inside the washing spin tank 2.

Next, a description will be made referring to FIGS. 9(a) and (b) on the operation in the second process of sprinkling washing water into the washing spin tank 2 from between the outer tank 1 and the washing spin tank 2 by the rotation of the washing spin tank 2.

Figure 9A:
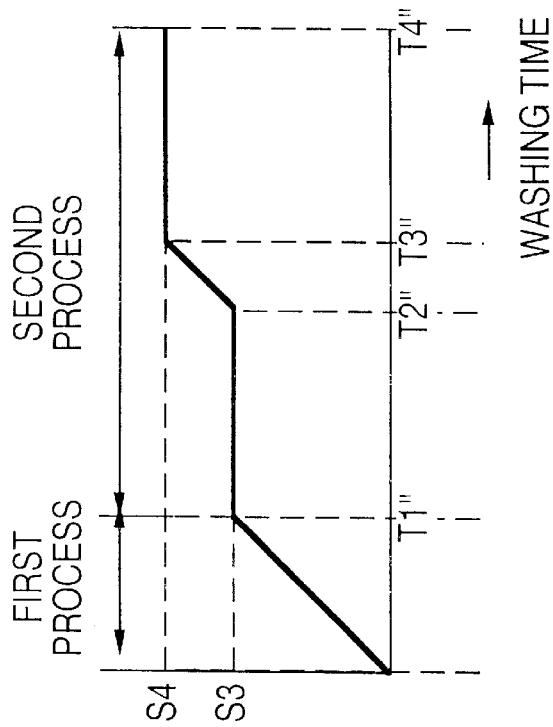
FIG. 9(a) is a time chart illustrating change of water level while the washing machine is in operation up to the second process.
Figure 9B:
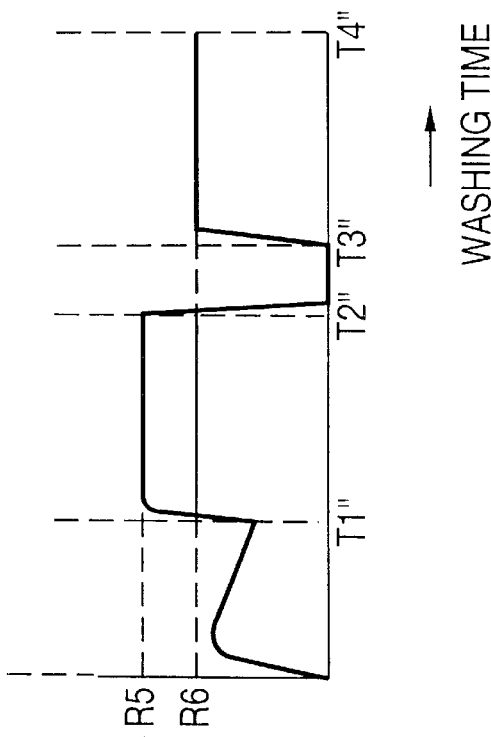
FIG. 9(b) is a time chart illustration change of rotational speed of the washing spin tank while the washing machine is in operation up to the second process.
Figure 11:
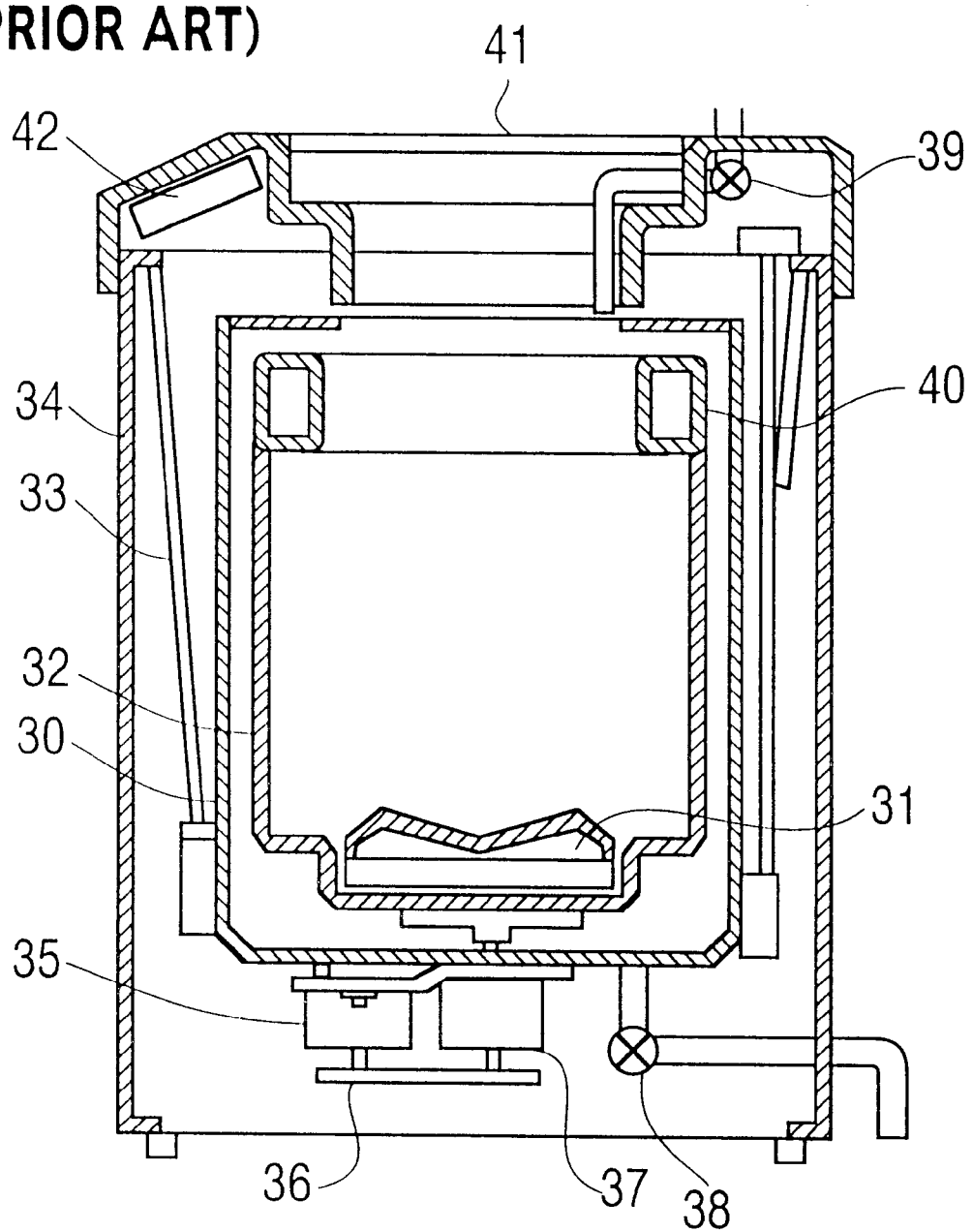
FIG. 11 is a vertical cross sectional view of a conventional washing machine.

As shown in FIG. 9(a), at time T1" at which the water level inside the washing spin tank 2 reaches S3, the information on the water level is sent form the water level detection means 11 to the rotational speed setting means 27, and a signal is sent to the rotational speed comparing means 28 so that the rotational speed becomes the appropriate rotational speed R5 corresponding to the water level S3. The rotational speed comparing means 28 compares the signal with the output of the rotational speed detection means 26, sets a conducting angle of the power switching means 15 by means of the conducting-angle setting means 29, and controls the rotational speed of the washing spin tank 2 so that it is maintained at R5 during the time period between T1" and T2".

When the water level inside the washing spin tank 2 rises to S4 during the time change from T2" to T3" shown in FIG. 9(a), a signal is sent from the water level detection means 11 to the rotational speed setting means 27, and further to the rotational speed comparing means 28 so that the rotational speed is controlled to be R6 which is the rotational speed corresponding to the water level S4. The rotational speed comparing means 28 compares the signal with the output of the rotational speed detection means 26, sets the conducting angle of the power switching means 15 by the conducting-angle setting means 29, and controls the motor 5 so that the rotational speed of the washing spin tank 2 is maintained at R6 during the period between T3" and T4".

Fourth Exemplary Embodiment

The control means 14 in FIG. 2 is so structured that, after carrying out the first process from the start of washing until time t1, shown in FIG. 10, it carries out during the second process between t1 and t6 periods from t1 to t2, t3 to t4, and t5 to t6 in which the rotational speed is R7, and periods from t2 to t3 and t4 to t5 in which the rotational speed is controlled between R7 and R8, so that the sprinkling of water from above is intermittently made during the second process. Other structures are the same as the above-described first exemplary embodiment.

Operation of the above structure is now described. By carrying out the first process of supplying water while rotating the washing spin tank 2 from the start of washing until time t1, the introduced detergent quickly dissolves and penetrates into the wash. By increasing the rotational speed of the washing spin tank 2 to R7 during the period from t1 to t2, the second process of sprinkling washing water from between the outer tank 1 and the washing spin tank 2 into the washing spin tank 2 is carried out.

In this second process, the washing water is uniformly sprinkled over the wash and at the same time the sprinkled washing water passes through the wash and circulates by centrifugal force generated by the rotation of the washing spin tank 2, the washing water thus acting on the dirt. Dirt on the wash is removed by repeatedly carrying out this sprinkling, passage, and circulation of the washing water.

However, there occurs a case while carrying out the second process in which a large quantity of bubbles due to the detergent composition is generated inside the washing spin tank 2 by the sprinkled washing water. When a large quantity of bubbles is generated like this, they may either flow out from the washing spin tank 2 or may flow in between the outer tank 1 and the washing spin tank 2 thus creating resistance against the rotation of the washing spin tank 2 and resulting in applying an excessive load on the motor 5.

Accordingly, in the present invention, a period with a rotational speed of R8 is provided during which sprinkling of water from above the washing spin tank 2 is stopped during the period the second process is being carried out. As a result, sprinkling of the washing water is intermittently made and generation of bubbles inside the washing spin tank 2 is controlled. By so doing, it is possible to prevent bubbles from flowing out of the washing spin tank 2 and from creating resistance against the rotation of the washing spin tank 2 thus applying an excessive load on the motor 5.

In this exemplary embodiment, although the pulsator is used in detecting the quantity of the wash, the pulsator is made to operate when necessary such as when dissolving the detergent, when the wash is made of robust cloths, or when the dirt is remarkable. Also, although sprinkling of water is intermittently made from above in the second process in the above-described first exemplary embodiment, it is also good to intermittently sprinkle water from above during the second process in the above-described second or third exemplary embodiment.

As set forth above, an embodiment of the washing machine comprises a washing spin tank rotatably provided inside an outer tank, a pulsator rotatably provided on the inside bottom of the washing spin tank, water supply means to supply water into the above-mentioned washing spin tank, drive means to drive the above-mentioned washing spin tank, and control means to control the action of the above-mentioned water supply means, drive means, and the like. The control means provides a first process of rotating the washing spin tank while supplying water and a second process of sprinkling washing water from between the outer tank and the washing spin tank into the washing spin tank. Accordingly, it is possible to prevent damage or tangling of the wash as the detergent is dissolved at the same time water is being supplied without stirring the wash, and dirt can be removed by passing the washing water through the wash without applying a mechanical force to the wash.

Also, quantity-of-clothes detection means can be included to detect the quantity of the wash inside the washing spin tank and the control means is made so as to start the first process after the quantity-of-clothes has been detected, the washing water can be made to penetrate directly into the wash at the same time water supply is started after detection of the quantity of clothes, and the action of removal of dirt by penetration of washing water can be made at the same time as the start of washing, thereby enabling effective and efficient removal of dirt.

Further, since the control means is able to make the rotational speed of the washing spin tank variable depending on the water level of at least one of the first and the second processes, it is possible to achieve optimum dissolution of detergent and optimum sprinkling of washing water, thus allowing use of the washing machine without exerting an excessive load.

Since the control means is made to intermittently sprinkle water from above in the second process, it is possible to control bubbling of the washing water and to have efficient washing, while keeping the operating condition of the washing machine optimum.

What is claimed is:

1. A washing machine, comprising:
   an outer tank;
   a washing spin tank rotatably provided within said outer tank;
   a valve to supply water to said washing spin tank;
   a motor to drive said washing spin tank; and
   a controller to control said valve and said motor, wherein said controller is capable of performing a first process of operating said valve to supply water to said washing spin tank and operating said motor to drive said washing spin tank at a rotational speed that does not cause water to sprinkle from above into said washing spin tank and a second process of raising water in between said washing spin tank and said outer tank by operating said motor to drive said washing spin tank such that water sprinkles from above into said washing spin tank.

2. A washing machine claimed in claim 1, further comprising a quantity-of-clothes detector to detect a quantity of wash inside said washing spin tank, wherein said controller is capable of starting the first process after said quantity-of-clothes detector detects the quantity of wash.

3. A washing machine claimed in claim 2, wherein said controller is capable of varying a rotational speed of said washing spin tank depending on a water level during at least one of the first and second processes.

4. A washing machine claimed in claim 2, wherein said controller is capable of intermittently operating said motor to drive said washing spin tank, such that water intermittently sprinkles from above into said washing spin tank during the second process.

5. A washing machine claimed in claim 1, wherein said controller is capable of varying a rotational speed of said washing spin tank depending on a water level during at least one of the first and second processes.

6. A washing machine claimed in claim 5, wherein said controller is capable of intermittently operating said motor to drive said washing spin tank, such that water intermittently sprinkles from above into said washing spin tank during the second process.

7. A washing machine claimed in claim 1, wherein said controller is capable of intermittently operating said motor to drive said washing spin tank, such that water intermittently sprinkles from above into said washing spin tank during the second process.

8. A washing machine claimed in claim 1, wherein during each of the first and second processes a pump is not being operated.

9. A washing machine, comprising:

an outer tank;

a washing spin tank rotatably provided within said outer tank;

a pulsator rotatably provided at a bottom of said washing spin tank;

a valve to supply water to said washing spin tank;

a motor to drive said washing spin tank and said pulsator; and a controller to control said valve and said motor, wherein said controller is capable of performing a first process of operating said valve to supply water to said washing spin tank and operating said motor to drive said washing spin tank at a rotational speed that does not cause water to sprinkle from above into said washing spin tank and a second process of raising water in between said washing spin tank and said outer tank by operating said motor to drive said washing spin tank such that water sprinkles from above into said washing spin tank.

10. A washing machine claimed in claim 9, further comprising a quantity-of-clothes detector to detect a quantity of wash inside said washing spin tank, wherein said controller is capable of starting the first process after said quantity-of-clothes detector detects the quantity of wash.

11. A washing machine claimed in claim 10, wherein said controller is capable of varying a rotational speed of said washing spin tank depending on a water level during at least one of the first and second processes.

12. A washing machine claimed in claim 10, wherein said controller is capable of intermittently operating said motor to drive said washing spin tank, such that water intermittently sprinkles from above into said washing spin tank during the second process.

13. A washing machine claimed in claim 10, wherein said quantity-of-clothes detector detects the quantity of wash based on a degree of decrease in rotational speed of said pulsator when said motor stops driving said pulsator.

14. A washing machine claimed in claim 9, wherein said controller is capable of varying a rotational speed of said washing spin tank depending on a water level during at least one of the first and second processes.

15. A washing machine claimed in claims 14, wherein said controller is capable of intermittently operating said motor to drive said washing spin tank, such that water intermittently sprinkles from above into said washing spin tank during the second process.

16. A washing machine claimed in claim 9, wherein said controller is capable of intermittently operating said motor to drive said washing spin tank, such that water intermittently sprinkles from above into said washing spin tank during the second process.

17. A washing machine claimed in claim 9, wherein during each of the first and second processes a pump is not being operated.

\* \* \* \* \*